TO DISTORTION
MEASURING CIRCUIT 46

INVENTORS
HORACE J. BRITT
JAMES E. BRITT
JAMES T. NEISWINTER
JACOB L. WALLACE JR.

BY Tipton D. Jennings
ATTORNEY

June 6, 1967 H. J. BRITT ET AL 3,324,244
PULSE DISTORTION MEASURING DEVICE
Filed Aug. 29, 1963 3 Sheets-Sheet 3
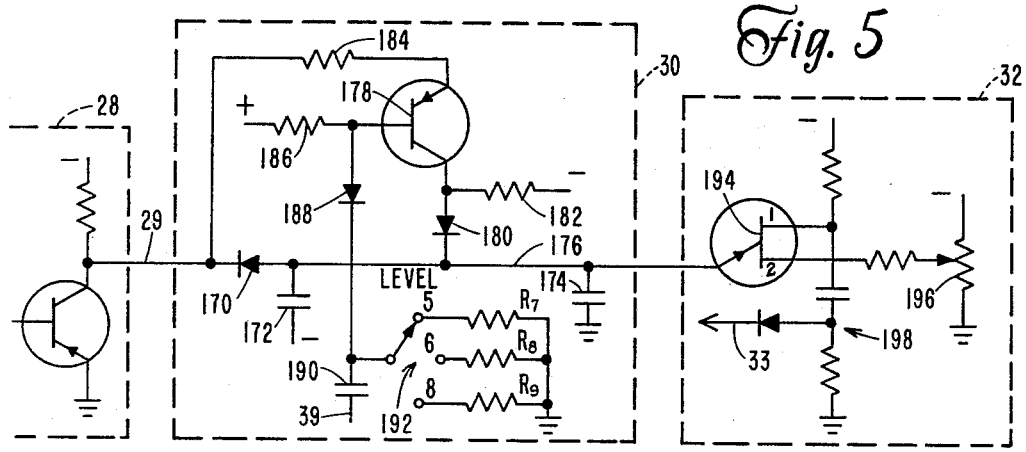
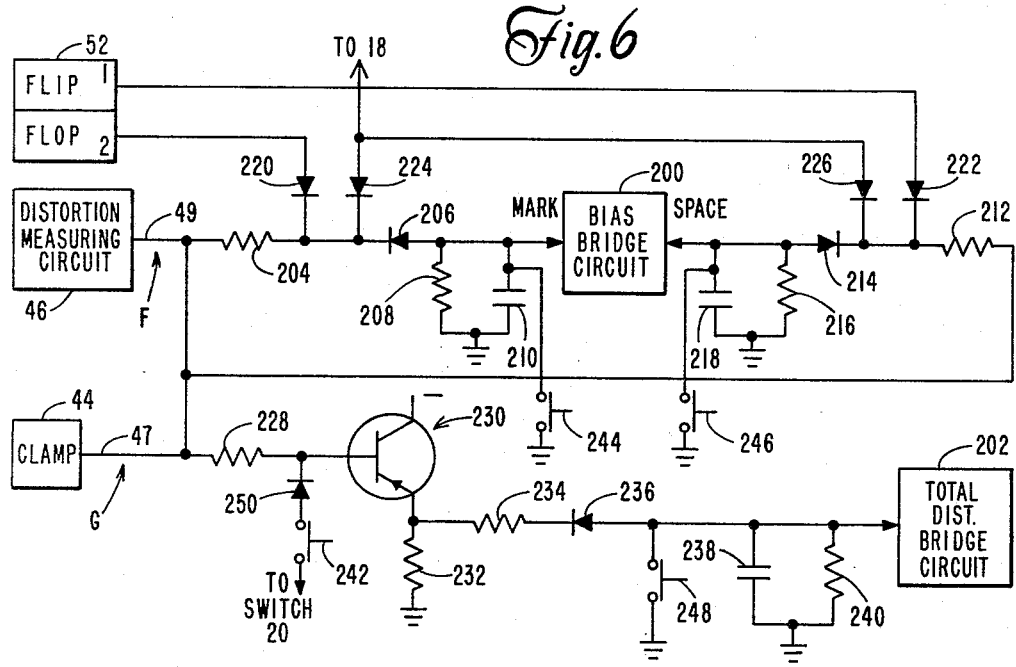
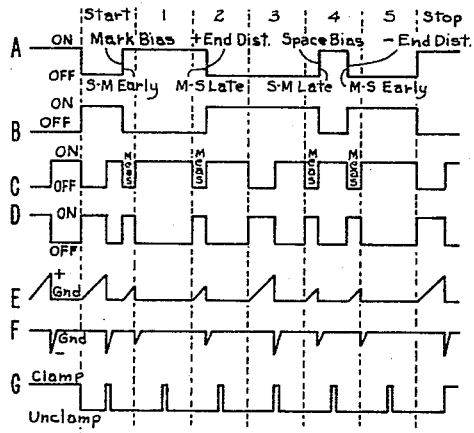
INVENTORS
HORACE J. BRITT
JAMES E. BRITT
JAMES T. NEISWINTER
JACOB L. WALLACE JR.
BY
*Tipton D. Jennings*
ATTORNEY ދ
United States Patent Office 3,324,244
Patented June 6, 1967

3,324,244
PULSE DISTORTION MEASURING DEVICE
Horace J. Britt, Alexandria, and James E. Britt, Annandale, Va., James T. Neiswinter, Garden City, N.Y., and Jacob Lightsey Wallace, Jr., Springfield, Va., assignors to Atlantic Research Corporation, Fairfax County, Va., a corporation of Virginia
Filed Aug. 29, 1963, Ser. No. 305,302
12 Claims. (Cl. 178—69)

The present invention relates in general to distortion measuring equipment, and more particularly to apparatus for measuring and indicating the distortion of pulses in coded signals such as those used in telegraph and data transmission systems.

For effective control and trouble shooting of circuits of the type encountered in telegraph and data transmission systems employing coded trains of impulses, it is useful to be able to reliably detect the existence of distortion of the signal impulses. There are several basic types of distortion which affect the reliability of telegraph and data signals to produce proper operation of the system components. A common feature of each of these types of distortion is that the marking or spacing pulses are lengthened or shortened by the distortion, either in a uniform or a random manner.

Various techniques have been devised for monitoring or measuring distortion. The main technique involves "short-pulse" measurement in which the incoming pulses are compared with a standard or a unit pulse length for determining whether any of the incoming pulses are shorter than the standard, and in some equipment the degree of shortness is determined. The present invention is directed towards an improved technique for measuring distortion, known as "start-stop" measurement, which affords an indication of the presence and amount of distortion both as to shortened pulses and lengthened pulses and even when both types of distortion occur in an incoming signal. Accordingly, it is a general object of this invention to provide a novel start-stop distortion measuring device which accurately measures and indicates the degree of distortion of pulses in a coded signal.

Another object of the invention is to provide an improved distortion measuring device in which the actual transition points of the incoming pulses are compared with ideal transition points to determine the existence of distortion.

A more specific object of the invention is to provide a start-stop distortion measuring device in which the actual transition points of the incoming signals are compared with ideal transition points relative to a start pulse to determine the extent to which the actual points are displaced in time from the ideal points.

A further object is to provide an improved distortion measuring device capable of operation with a variety of inputs having different code formats and transmission speeds.

Other objects and advantages will become apparent from a reading of the following detailed description taken in conjunction with the drawings in which:

FIGURES 2 to 6 are schematics of circuits corresponding to certain blocks in the diagram of FIGURE 1; and FIGURE 7 is a chart of wave forms illustrating wave shapes at selected points in FIGURES 1 to 6 and which are used in explaining the operation of the invention.

Figure 1:
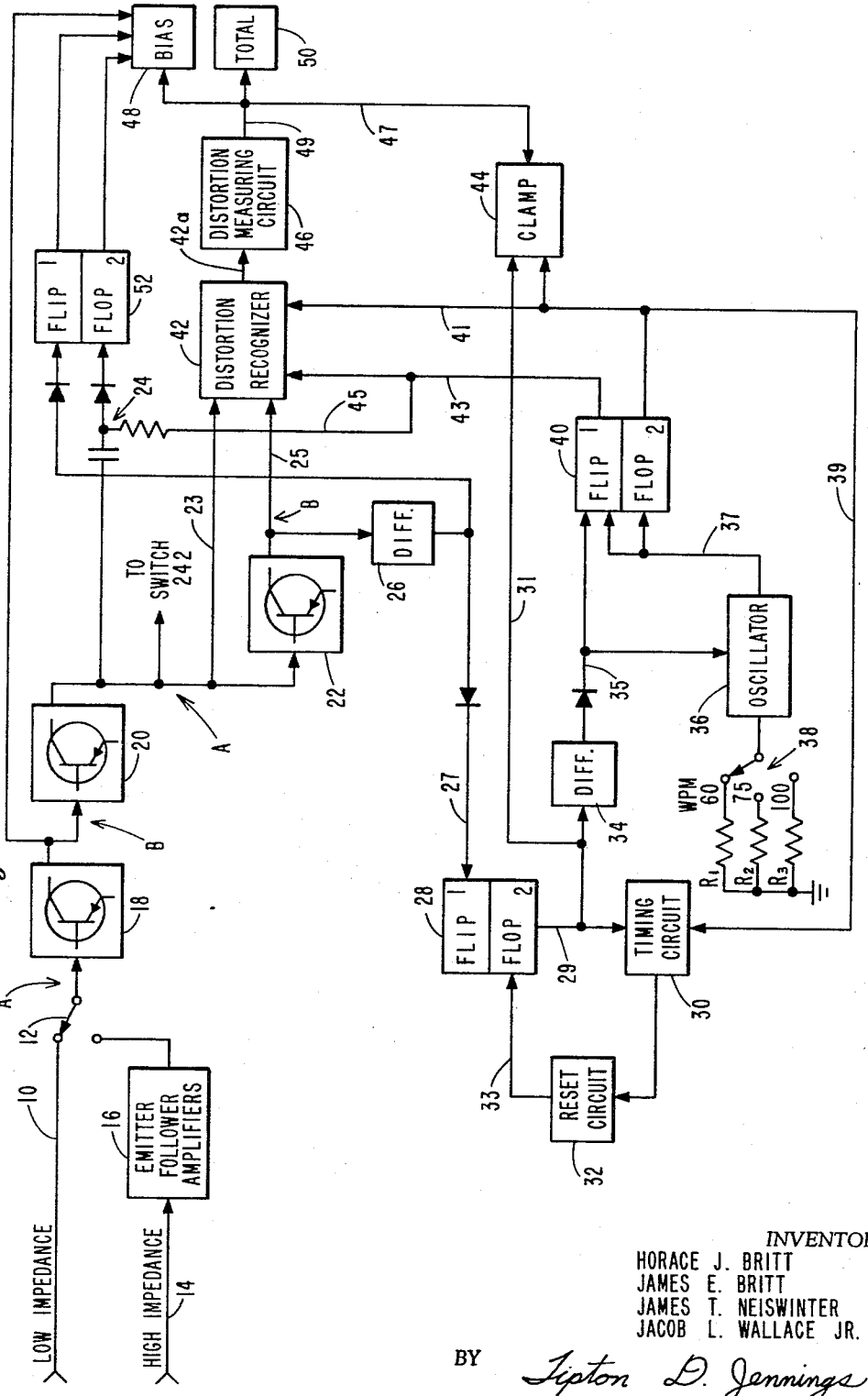
FIGURE 1 is a block diagram of a preferred embodiment of the invention showing its overall construction.

Referring to FIGURE 1, the device of the present invention discloses apparatus for use by personnel in detecting and measuring distortion is coded signals such as start-stop and synchronous telegraph signals. In general the block-diagram shown comprises timing and oscillating circuits controlled by the start-pulse to initiate an ideal character timing period and to synchronize the oscillator output pulses. In this manner ideal mark-to-space and space-to-mark transition points are generated internally and fed to a distortion recognizing circuit for comparison with the actual transition points in the incoming signal. Any time difference which occurs between the receipt of an ideal transition point and an actual transition point (or vice-versa) is measured and the output is fed to various distortion indicating circuits. The ideal character period terminates during the stop pulse and no further outputs can affect the indicating circuits until a subsequent start pulse again initiates an ideal character timing period in the timing circuits.

In start-stop telegraph signals, which will be referred to as an aid in describing the apparatus, the start pulse is normally followed by a five, six or eight unit impulse code, and arrives at a certain transmission speed (baud rate), e.g., 60, 75, or 100 words per minute. The apparatus is provided with an input selector switch 12 which permits both a high impedance input on line 14 to measure signals on a voltage basis, as when the device is connected to a telegraph system terminal HUB or Electronic Loop Signal, and a low impedance input on line 10 to measure signals on a current basis, as when the device is connected across a 100 ohm resistor in series with the telegraph loop to provide current inputs of 20 ma., 60 ma. or "Polar," this last being where the incoming pulses vary above and below a zero-current reference. In the case of voltage inputs, the signals are first received on line 14 by emitter followers 16 to transform the high impedance input to a low impedance. Emitter followers 16 are preferably two conventional series-connected transistor amplifiers, the first transistor having a selectable base bias, the value of the bias depending on the voltage amplitude and polarity of the input signal. Both line 10 and line 14 have associated therewith filter circuits (not shown) to eliminate relay bounce and other transients from entering the measuring circuit. In the ensuing detailed description of the block and schematic diagrams it will be assumed for convenience that the set is connected to a 60 ma. neutral telegraph circuit and the input signal is a 5-level code (five unit pulses per character) at 60 words per minute (w.p.m.) which is fed on line 10 through the input selector switch 12 to electronic switch 18.

Switches 18, 20, 22 are three PNP transistors connected in cascade, their collectors being at approximately ground potential when conducting and at a negative bias voltage (e.g., −18 volts) when non-conducting. The base of transistor 18 to which the input signals are applied is provided with a variable bias (not shown) corresponding to the telegraph system to which the input line is connected so that transistor 18 will conduct on spacing pulses and be held non-conducting on marking pulses. Since transistor 18 also acts as an inverter to the incoming signal, transistor 20 conducts in opposition. Therefore, transistor 20 conducts on marking pulses and goes non-conducting on spacing pulses and, accordingly, its output waveform follows the input signal. Since transistor 20 also inverts the signal between its input and output, transistor 22 conducts on spacing pulses and goes non-conducting on marking pulses and its output follows the output wave-form of transistor 18.

The outputs of transistors 20 and 22 are connected to differentiators 24 and 26 respectively. On space-to-mark (S–M) transitions of the incoming signal, transistor 20 goes from a non-conducting to a conducting state and a positive pip is generated by differentiator 24. On markto-space (M–S) transitions, transistor 22 goes from a non-conducting to a conducting state and a positive pip is generated by differentiator 26. Differentiator 26 is connected on line 27 to stage one of flip-flop 28. The output of this flip-flop 28 comes off of stage two and is fed to timing circuit 30 by line 29. Timing circuit 30 is connected to reset circuit 32 which is in turn connected through line 33 to the input of stage two of flip-flop 28. The output of stage two of flip-flop 28 is also connected to differentiator 34 whose output is passed by line 35 to the sync input of free-running oscillator 36. Oscillator 36 is used as a reference and continuously generates spikes separated by one-half of a unit pulse at the selected speed as determined by the speed selector switch 38. At 60 w.p.m. the unit length pulses are 21.955 ms. wide; therefore, the spikes from oscillator 36 are separated by 10.978 ms. Free-running oscillator 36 is conventional in construction and is preferably a unijunction transistor oscillator. The sync input is connected to the emitter of this transistor, and the time-constant of the relaxation circuit is controlled by the particular resistor connected to switch 38. The higher the incoming transmission speed the lower the value of the selected resistor. Accordingly, the time constant of the relaxation circuit is less and the repetition rate of oscillator 36 increases. A schematic of a unijunction oscillator which can be used is found on pages 194, 195 of G. E. Transistor Manual, 6th Edition, 1962.

The differentiated output of flip-flop 28 is also connected to stage one of a conventional flip-flop 40. Flip-flop 40 is subsequently driven by oscillator 36, the input being applied to both stages on line 37. The output of stage two of flip-flop 40 is connected to timing circuit 30 by line 39 to control the timing of the ideal character period, as later described. The output of this same stage is connected by line 41 to distortion recognizer 42 and to the clamping circuit 44. The output of stage one of flip-flop 40 is connected to distortion recognizer 42 on line 43 and to differentiator circuit 24 through line 45 to provide a ground path for this differentiator when stage one is conducting. Clamping circuit 44 is also connected to the output of stage two of flip-flop 28 by line 31.

The distortion recognizer 42 in addition to being connected to the outputs of flip-flop 40 is also connected to the output of transistor 20 by line 23 and transistor 22 by line 25. The output of distortion recognizer 42 is connected to distortion measuring circuit 46 by line 42a and the output of this last circuit is fed to bias indicating circuit 48 and the total distortion indicating circuit 50 on line 49. Clamp 44 is connected to the output of the distortion measuring circuit 46 by line 47 to prevent inputs from reaching the indicating circuits except at certain times as later explained. The outputs of differentiators 24 and 26 are connected to a flip-flop 52, called a mark and space bias separator. Flip-flop 52 is conventional with the output from differentiator 24 going to stage two and the output from differentiator 26 going to stage one. The output of these stages is applied to the bias circuit 48 to clamp the inputs to this circuit as later explained. The output of transistor switch 18 is also applied as a clamp to the bias indicating circuit 48.

*Distortion Recognizer 42*

Figure 2:
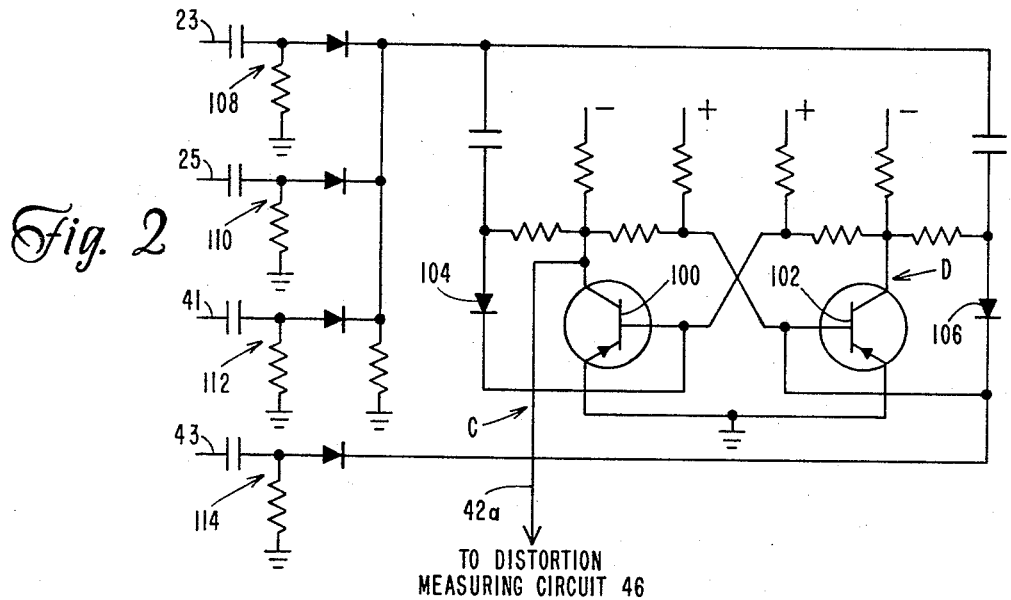

The distortion recognizer 42 is shown in schematic form in FIGURE 2. A conventional flip-flop is shown comprised of two stages, each stage having a transistor 100, 102, a steering diode 104, 106, and associated circuitry. The inputs to the distortion recognizer arrive on lines 23, 25, 41, and 43 from switch 20, switch 22, stage two of flip-flop 40 and stage one of flip-flop 40, respectively. These inputs are differentiated at 108, 110, 112, and 114, the positive pips being passed to the flip-flop circuit. The differentiated inputs from switches 20 and 22 and stage to of flip-flop 40 are applied via the the steering diodes 104 and 106 to the base of the transistor 100 or 102, whichever is in a conducting state. The differentiated input from stage one of flip-flop 40 is always applied to the base of transistor 102. The output of this distortion recognizing circuit is obtained from the collector of transistor 100 and applied on line 42a to the distortion measuring circuit 46.

*Distortion measuring circuit 46*

Figure 3:
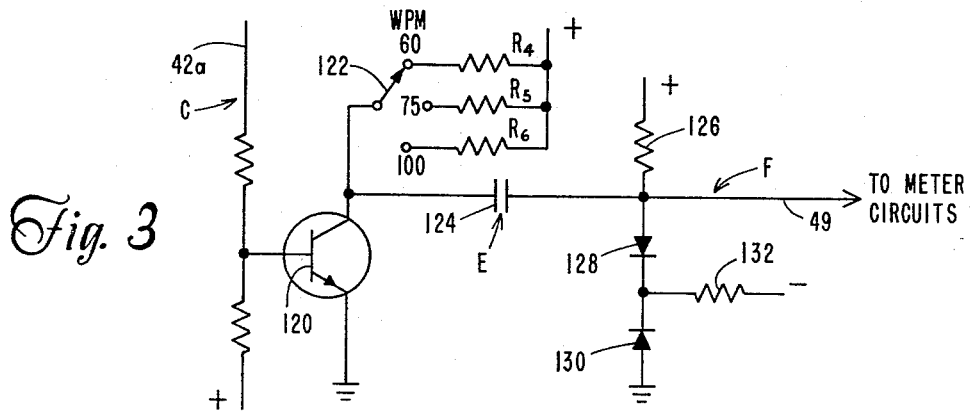

The schematic of the distortion measuring circuit 46 is shown in FIGURE 3 and comprises an NPN transistor 120 whose collector load resistor is selected by switch 122 to correspond to the input transmission speed, here being shown in the 60 w.p.m. position. The base of transistor 120, which is positively biased, receives input signals on line 42(a) from the output of transistor 100, which when non-conducting causes negative voltage to be applied to this base to make transistor 120 go non-conducting. The collector of transistor 120 is connected to the left side of capacitor 124. The right side of capacitor 124 is connected to a discharge path consisting of resistor 126 and positive potential source. The charging path for this capacitor is positive battery, 60 w.p.m. resistor selected by switch 122 and diodes 128 and 130 to ground. Diodes 128 and 130 have their cathodes connected to negative voltage through resistor 132. The output of this distortion measuring circuit consists of negative spikes which are passed on line 49 to the meter circuits. The rate of charge of capacitor 124 is determined by the speed resistor selected by switch 122. The higher the transmission speed the lower the value of the chosen resistor to enable a faster charge rate for this capacitor so that regardless of the input transmission speed a given percent of distortion will always enable the same charge to accumulate on capacitor 124 during a measurement.

*Clamp 44*

Figure 4:
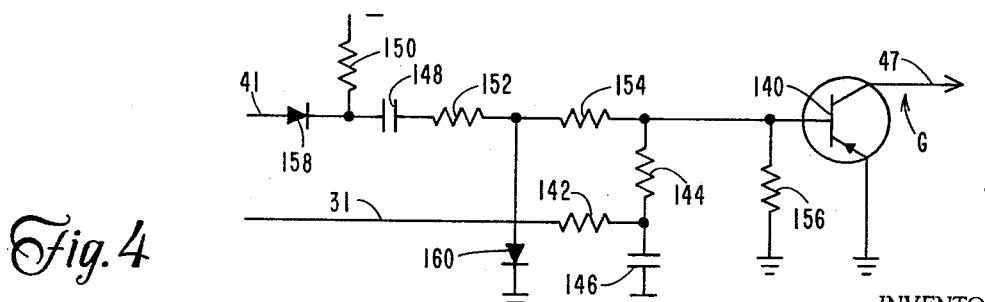

The clamping circuit 44 shown in FIGURE 4 is composed of a transistor 140 whose collector is connected to the output line 49 of distortion measuring circuit 46 by line 47. Resistors 142 and 144 are connected in series to the base of transistor 140 for applying inputs on line 31 from flip-flop 28. A capacitor 146 is connected between the common terminals of resistors 142, 144 and ground. Capacitor 148 is connected in series with the base of transistor 140 through resistances 152 and 154. A negative potential source is connected to the left side of capacitor 148 through resistance 150. Diode 158 is connected between the left side of capacitor 158 and the output of stage two of flip-flop 40 which arrives on line 41. Resistor 156 serves as the base bias resistor. Diode 160 offers a positive discharge path to ground for capacitor 148.

*Timing and reset circuits 30, 32*

FIGURE 5 shows the schematics of the timing circuit 30 and the reset circuit 32. Diode 170 is positioned to conduct with the application of negative voltage from stage two of flip-flop 28 on line 29. The anode of diode 170 is connected to capacitors 172 and 174 by line 176, the other sides of these two capacitors being connected to negative potential source and ground respectively. The collector of transistor 178 is connected through diode 180 to line 176, with the anode of this diode being back-biased by negative potential source through resistor 182 to prevent collector-to-base leakage current in transistor 178 when non-conducting. The emitter of this transistor is connected through resistor 184 to line 29 and the base is positively biased through resistor 186. Inputs to the base are applied from stage two of flip-flop 40 through diode 188 after differentiation by capacitor 190 and the resistor selected by the Level Selector switch 192. The pointer of switch 192 is here shown as being in the position designated as "5," corresponding to a five-level code. If the input signal to the measuring set was composed of a six or eight unit pulse character, then the switch 192 would be moved to the corresponding numbered position.

The effect of having the different resistors is to be able to change the duration of the conduction time of transistor 178 and consequently the charge and discharge rate of capacitors 172 and 174, respectively. This particular circuit is used because its internal operation is independent of the speed of the incoming signal being applied to the measuring set. It, therefore, particularly permits ease of maintenance and at the same time generates stable ideal character timing periods. Line 176 is also tied into the emitter of unijunction transistor 194 in the reset circuit. Base one of this transistor is negatively biased. Base two is connected to potentiometer 196 to enable adjustment of the firing point of unijunction 194 with respect to the positive voltage applied to its emitter. The output of the unijunction is differentiated at 198, and passed to stage two of flip-flop 28 by line 33.

*Utilization circuits 48, 50*

In FIGURE 6, line 49 connects the output of distortion measuring circuit 46 to the bias distortion and total distortion bridge circuits 200 and 202, respectively. These two circuits have a meter (not shown) connected across the bridge and are of the type shown in FIGURE 2 of patent application Ser. No. 136,764, filed September 8, 1961, now U.S. Patent No. 3,106,608, issued October 8, 1963 and assigned to the assignee of the present invention. The input to the mark side of bridge circuit 200 is applied through resistor 204, diode 206 and the parallel circuit of grid leak resistor 208 and storage capacitor 210 to ground. The input to the space side is applied through resistor 212, diode 214 and the parallel circuit of grid leak resistor 216 and capacitor 218 to ground. Clamping diodes 220 and 222 are connected to flip-flop 52 while clamping diodes 224 and 226 are connected to the output of switch 18. The input to bridge circuit 202 is applied through an emitter follower circuit, consisting of resistor 228 transistor 230 and resistor 232, and through resistor 234, diode 236 and the parallel circuit of capacitor 238 and grid leak resistor 240 to ground. Clamping switch 242 when depressed connects the input of this circuit to the output of transistor 20 via diode 250. Clamp 44 is connected to the input of both bridge circuits by line 47. Resistances 208, 216 andl 240 are quite high, e.g., 100 megohms, to prevent any significant discharge of their capacitors until reset switches 244, 246 and 248 are actuated to short-cut these capacitors.

*Operation*

To aid in an understanding of the operation of the invention FIGURE 7 is provided and shows various wave shapes on lines A to G which correspond to the waveforms at selected points in the remaining figures. While Line A shows a character containing both mark and space bias, this is rarely, if ever, the actual case and this character has been used just for purpose of illustrating the operation of the invention. During the idle condition the input signal is marking. Since a start pulse is represented by a spacing condition, the advent of a character (Line A) causes a M-S transition. Transistor switch 22 conducts (Line B) and a positive pip is passed by differentiator 26 to flip-flop 28 to change its conduction state from stage one conducting to stage two conducting. This starts the ideal character timing period.

When stage two goes conducting, differentiator 34 generaes a positive pip which is passed to the emitter (not shown) of oscillator 36 and to stage 1 of flip-flop 40. In this manner oscillator 36 is synchronized conducting and stage one of flip-flop 40 is synchronized non-conducting with the M-S transition of the start pulse. Subsequently, 10.978 ms. later, at the one-half ideal pulse point, a positive spike is generated by oscillator 36 and fed on line 37 to flip-flop 40, the spike being steered to conducting stage two to render it non-conducting. Non-conducting stage one, therefore, goes conducting. Then 10.978 ms. later at the ideal pulse point another spike is generated by oscillator 36 and this too is fed to flip-flop 40. However, it is steered to conducting stage one, turning it off while stage two goes conducting. This procedure continues with spikes being generated by oscillator 36 every 10.978 ms., which spikes are used to drive the flip-flop 40. Accordingly, stage one always conducts at the ideal half-pulse point and a positive pulse, representing ground potential of the collector of the conducting transistor (not shown), appears on its output line 43. Stage two always conducts at the ideal pulse point and a positive pulse appears on its output line 41. The outputs of both stages are fed to distortion recognizer 42 so that this circuit receives pulses whose leading edges correspond to ideal and one-half ideal transition points for the unit pulses in the incoming character.

In timing circuit 30, capacitor 174 (FIGURE 5) has been previously charged to a negative potential from the collector voltage supply of stage two of flip-flop 28 during the idle condition when stage two was non-conducting. Capacitor 172 is uncharged since an equal negative voltage was present on both sides of this capacitor during the idle condition. When the arrival of a start pulse causes stage two of flip-flop 28 to become conducting, its collector and consequently output line 29 rises to ground potential. Diode 170 becomes back-biased, isolating capacitors 172, 174. At one-half the ideal pulse point stage two of flip-flop 40 goes non-conducting and the leading edge of the negative voltage pulse appearing on line 39 is differentiated by capacitor 190 and the resistor selected by switch 192 and applied as a negative pip to the base of transistor 178, turning it on. Diode 180 becomes forward biased and a ground path is offered to line 176 through this diode, the collector-emitter path of transistor 178, and resistance 184, to line 29 which is at ground potential. Capacitor 172 begins to charge and capacitor 174 begins to discharge until the positive pip on the base of transistor 178 decays sufficiently and this transistor shuts off. At one-half the ideal pulse point of the first unit pulse in the incoming character another negative pip causes transistor 178 to conduct and capacitor 172 again charges slightly and capacitor 174 discharges slightly. This, in effect, creates a staircase charging and discharging of capacitors 172 and 174, respectively, the steps occurring at each one-half ideal pulse point. This procedure continues until one-half pulse length into the stop pulse at which time the charge on capacitors 172 and 174 step to a voltage level equal to or greater than the bias level at the emitter of unijunction 194. Unijunction 194 conducts from the emitter to base 1 and a positive pip passes on line 33 to the base of stage two of flip-flop 28. Stage two becomes non-conducting and stage one conducting terminating the ideal character timing period. Flip-flop 28 remains in this state until a subsequent start pulse again causes a positive pip to be applied to its stage one to reverse the state of conduction in the two stages and begin another timing period. It should be noted that during the character timing period, positive pips generated by differentiator 26 in response to M-S transitions in the input signal will have no effect on flip-flop 28 since the pips are applied only to stage one and this stage is already in a non-conducting state.

As previously described the start-pulse has initiated the ideal character period and synchronized the oscillator 36 and flip-flop 40. At one-half the ideal pulse point of the start pulse a positive spike from oscillator 36 drives stage two of flip-flop 40 non-conducting and stage one conducts. The positive pulse on line 43 is differentiated at 114 and a positive pip is passed to the base of transistor 102 rendering it non-conducting (Line D) and transistor 100 conducts. (Line C). In addition to receiving inputs from flip-flop 40 at ideal and one-half ideal transition points, distortion recognizer 42 also obtains an input from transistor 20 on actual S-M transitions and from transistor 22 on actual M-S transitions.

The first unit pulse in the incoming character (Line A) is a mark pulse, distorted by marking bias causing an early arrival. Transistor 18 goes non-conducting and transistor 20 conducts. The pulse wave-form output on line 23 changes from a spacing to a marking pulse and the S-M transition is differentiated at 108 and the pip is steered by diode 104 to transistor 100 turning it off (Line C). The collector of transistor 100 goes negative which turns off transistor 120 (FIGURE 3) by line 42a and the measurement begins. Capacitor 124 begins to charge (Line E), the path being from positive battery through the 60 w.p.m. resistor chosen by switch 122, capacitor 124 conducting diodes 128 and 130 to ground. At the ideal pulse point oscillator 36 drives stage one of flip-flop 40 non-conducting and stage two conducts. A positive pulse appears on line 41, is differentiated at 112 and passed by diode 106 to transistor 102 making it non-conducting (Line D). Transistor 100 conducts (Line C) and its collector goes to ground permitting transistor 120 to conduct to end the measurement. When transistor 120 goes conducting, the left side of capacitor 124 becomes grounded through transistor 120 and the right side of this capacitor goes negative, back-biasing diode 128. This negative charge then discharges rapidly through resistor 126, passing to the meter circuits a negative spike (Line F) proportional in amplitude to the amount of the positive charge which accumulated on the left side of capacitor 124 during the time that transistor 120 was non-conducting.

At one-half the ideal pulse point of the first unit pulse a positive pip, formed by differentiator 114 acting on the pulse output of stage one of flip-flop 40, is passed to the base of transistor 102. However, this transistor is already non-conducting (Line D) and no change in its state of conduction occurs. At the ideal pulse point for the second unit pulse, a positive pip formed by differentiator 112 is passed to the base of transistor 100 turning it off and transistor 120 which follows transistor 100 again becomes non-conducting, initiating another measurement (Line E). Line A of FIGURE 7 shows that the first unit pulse of the incoming signal possesses positive end distortion creating a late M-S transition. This transition causes a positive excursion on line 25 (Line B) when transistor 22 goes conducting. The positive excursion is differentiated at 110 to present a positive pip at the base of the conducting transistor 102, turning it off. Transistor 100 conducts as does transistor 120 to end the measurement. A negative spike (Line F) occurs, as it did during the mark bias measurement, at the output of the distortion measuring circuit 46.

Line A of FIGURE 7 further shows that the leading edge of the fourth unit pulse of the incoming character has been displaced in time due to spacing bias distortion. At the ideal pulse point of the fourth unit pulse, tarnsistor 100 is caused to go non-conducting (Line C) by the input on line 41 from stage two of flip-flop 40. Another measurement begins because transistor 120 also becomes non-conducting enabling capacitor 124 to begin charging (Line E). The late S-M transition of the mark pulse appearing on line 23 is differentiated at 108, the resulting pip turning off transistor 102. Transistor 100 conducts, transistor 120 follows and capacitor 124 discharges to again pass a negative output spike (Line F), proportional in height to its accumulated charge, on line 49 to the meter circuits.

Line A of FIGURE 7 additionally shows that the mark pulse representing the fourth unit pulse contains negative end distortion represnted by an early M-S transition. At one-half the ideal pulse point of the fourth unit pulse a positive pip is again passed to the base of transistor 102; however, this transistor is already off (Line D) and the pip has no effect on the distortion recognizer. The early M-S transition (Line A) causes a positive excursion on line 25 (Line B) which is differentiated at 110 and passed to the base of transistor 100, making it nonconducting. Transistor 120 also cuts off and capacitor 124 (Line E) begins its charge. At the ideal pulse point flip-flop 40 again changes state and a positive pip created by differentiator 112 is passed via steering diode 106 to transistor 102 rendering it non-conducting. Transistors 100 and 120 conduct to end the measurement. Capacitor 124 then passes a spike to the meter circuits (Line F).

It is thus seen that all distortion is measured with respect to the ideal pulse point. This requires, in summary, that transistor 100 perform as follows: For mark bias which occurs when the S-M transition is early transistor 100 must go non-conducting on the early S-M transition and conduct at the ideal pulse point. For spacing bias which occurs when the S-M transition is late transistor 100 must go non-conducting at the ideal pulse point and conduct at the late S-M transition. For positive end distortion which occurs when the M-S transition is late transistor 100 must go non-conducting at the ideal late pulse point and conducting at the late M-S transition. For negative end distortion which occurs when the M-S transition is early transistor 100 must go non-conducting at the early M-S transition and conducting at the ideal pulse point. These relationships are established by having transistor 102 go non-conducting, or remain non-conducting if already in this state, at each one-half ideal pulse point so that the next input to distortion recognizer 42 on either lines 23, 25, or 41 will make transistor 100 go non-conducting to begin the distortion measurement.

The relationship of the clamping and indicating circuits with the distortion recognizing and measuring circuits to obtain a classification of the particular types of distortion will now be explained. Stage one of flip-flop 52 is generally non-conducting during the idle marking condition. In any event a positive pip from differentiator 26 on the start-pulse M-S transition (Line B) will insure that this stage goes non-conducting. Accordingly, stage two is conducting and its output is at ground forward-biasing clamping diode 220 (FIGURE 6) at the input to the mark bias side of the bridge circuit 200. When an early S-M transition occurs as when marking bias is present, stage one of flip-flop 40 is at that time conducting and its output is at substantially ground potential. Differeniator 24 is thus equipped to generate a pip since circuit ground is provided through line 45. As shown in the sample character of FIGURE 7 the S-M transition of the first unit pulse arrives early. This pulse, therefore, is differentiated at 24 and the pip passed to the stage two of flip-flop 52 turning it off, while stage one conducts. With stage one conducting its output is at ground and diode 222 is forward-biased, clamping the input circuit of the space bias side of bridge circuit 200 to ground.

At the ideal pulse point of the first unit pulse the distortion measuring circuit 46, as aforedescribed, emits a spike on line 49 which passes through diode 206 to storage capacitor 210. Diode 206 becomes back-biased by this charge on capacitor 210 and the voltage remains stored on this capacitor. The bridge becomes unbalanced and a meter (not shown) graduated in percent distortion with center zero deflects to the mark bias side in proportion to the charge on capacitor 210 to give a true reading of percent marking bias distortion. The spike is not permitted to reach the space side of the bridge circuit 200 since diode 222 is at this time clamping the input of the space side to ground potential.

The spike on line 49 also passes to emitter follower 230 causing it to conduct. The emitter follower amplifies the small current input to charge quickly storage capacitor 238. This charge unbalances bridge circuit 202 giving a reading of total percent distortion on the meter (not shown).

The occurrence of positive end distortion (Line A) causes a spike to leave capacitor 124 in distortion measuring circuit 46 at the late M-S transition as previously explained. At this time transistor switch 18 goes conducting due to the arrival of a spacing pulse at its input and its output is at ground potential (Line B). Diodes 224, 226 (FIGURE 6) are forward biased clamping both inputs to the bias bridge circuit 200 preventing the spike on line 49 from reaching this circuit. The spike instead is only applied to the emitter follower 230, amplified and fed to the total distortion bridge.

The advent of spacing bias (Line A) finds stage one of flip-flop 52 non-conducting since the previous M-S transition would have been differentiated at 26 and fed to this stage to cut it off. Stage two is conducting and diode 220 is forward biased, clamping to ground the marking side of the bias circuit 200. The late S-M transition indicative of spacing bias does not switch the states of flip-flop 52 as does an early S-M transition because its late arrival finds stage one of flip-flop 40 non-conducting and the differentiator 24 is without circuit ground on line 45 to differentiate the pulse. Stage two of flip-flop 52, therefore, remains conducting and the spike generated by the distortion measuring circuit 46 at the end of the measurement is passed by line 49 only to the spacing side of the bias circuit 200 to charge capacitor 218 and unbalance the bridge. The meter (not shown) will then indicate the percent spacing distortion which the spike represents. The spike is also passed to the total distortion circuit as it was in the previous examples.

The spike formed by capacitor 124 in the distortion circuit 46 at the end of the negative end distortion measurement is passed, as in the case of the positive end distortion measurement, only to the total distortion circuit 50. As explained above this is due to the action of diodes 224 and 226 which becomes forward-biased by conducting transistor switch 18 to clamp the input to both sides of the bias bridge 200 to ground.

The diodes 206, 214 and 236 at the inputs to the meter circuits become back biased when a negative charge is dumped into their respective storage capacitor 210, 218, and 238. Subsequent negative spikes applied to any of these input diodes will not pass unless the voltage level of the spike is more negative than the charge on the corresponding storage capacitor so that the diode can become forward-biased.

Since the total distortion circuit 202 gives the reading which represents the greatest distortion irrespective whether it is caused by bias or end distortion, it is sometimes desirable to eliminate the effect of bias distortion from this circuit so that the meter will just display end distortion. The bias distortion input can be eliminated by depressing switch 242 in FIGURE 6 thus connecting the input of transistor 230 to the output of transistor switch 20. Since bias distortion is measured after the input signal has gone from space to mark, the input signal is marking and switch 20 is conducting putting its output at ground potential. With switch 242 depressed the input to transistor 230 is at ground potential at this time and any negative spikes from distortion measuring circuit 46 which represent bias distortion are clamped to ground through diode 250.

Following the five units pulses of the sample character a S-M transition (Line A) occurs for the stop pulse. Had the fifth unit pulse been a mark pulse the input signal would have remained marking. In either event, stage 2 of flip-flop 40 goes non-conducting at one-half the ideal pulse point into the stop pulse and a negative pulse appears on line 39. The negative pip resulting from differentiation causes transistor 173 (FIGURE 5) to conduct again as explained heretofore. The charging and discharging steps of capacitors 172 and 174, respectively, reach the critical level causing unijunction transistor 194 to conduct. The positive voltage swing of base one is differentiated at 198 and a positive pip is passed to stage two of flip-flop 28 by line 33. This pip cuts off stage two and stage one becomes conducting. The character timing period is over. Stage one remains conducting until another start pulse arrives to reverse the conduction in the two stages and begin another timing period. During the idle period free-running oscillator continues to drive flip-flop 40 which in turn drives distortion recognizer 42. As shown in Lines E and F of FIGURE 7, capacitor 124 continues it charging and discharging cycle and outputs are generated in the distortion measuring circuit 46. These output spike, however, are clamped to ground through the action of clamp 44 and the meter circuits are unaffected.

By referring to FIGURE 4 it is seen that during the idle condition the base of transistor 140 is at a negative potential since it is connected via line 31 to the output of non-conducting stage two of flip-flop 28. Transistor 140 is therefore conducting (Line G), clamping all output spikes from measuring circuit 46 to ground. With the occurrence of a start pulse, stage two of flip-flop 28 conducts removing the negative potential from the base of transistor 140 permitting it to go non-conducting, after a slight delay caused by the discharging of timing capacitor 146 thereby keeping the clamp effective during the start M-S transition. With stage two of flip-flop 28 conducting, the control of clamp 44 passes to stage two of flip-flop 40. At the start pulse this stage conducts forward-biasing diode 158 and thus grounding the left side of capacitor 148. Diode 160 is also forward-biased to insure that no charge can accumulate on capacitor 148. At one-half the ideal pulse point stage two of flip-flop 40 becomes non-conducting back-biasing diode 158. Capacitor 148 has a very small capacitance and it charges quickly, during which time a negative spike passes to the base of transistor 140 turning it on to clamp (Line G) the output of the distortion measuring circuit 46 (Line F). The negative spike is held temporarily by capacitor 146 to provide time assurance that the clamp is effective. This clamping action of transistor 140 at the one-half ideal pulse points prevents any outputs from affecting the bridge circuits which are not a result of a distortion condition. That these outputs will occur is seen from inspecting Lines C and D of FIGURE 7 which show that the switching within distortion recognizer 42, necessary to ready this circuit for distortion occurrences, causes transistor 120 to go non-conducting at times other than when a distortion measurement is to take place. This action enables capacitor 24 to charge (Line E) and a spike to be gneerated (Line F) when transistor 120 conducts at the one-half pulse points, as shown. At the ideal pulse points when stage two of flip-flop 40 goes conducting diode 158 conducts and the left side of capacitor 148 drops to ground. Capacitor 148 discharges through diode 160 which is now forward-biased. With capacitor 148 discharged, the circuit is ready to operate as a clamp at the next one-half ideal pulse point. At one-half the ideal pulse point into the stop pulse when the ideal character period terminates, stage two of flip-flop 28 again becomes non-conducting and control of the clamp 44 passes back to this last-mentioned stage thus keeping the clamp operative until a subsequent start pulse occurs.

Synchronous telegraph signals are also capable of being measured by the aforedescribed measuring set even though such signals do not contain start and stop pulses. Since any M-S transition will start the character timer, the distortion measurements take place on the unit pulses following the initial M-S transition. The measuring operation is as described above for start-stop telegraph signals. The measurements continue until the character time concludes its timing period. Subsequently, the next M-S transition in the pulse train following the termination of the previous character timing period restarts the character timer for another measurement period. In effect, with a synchronous signal input, the set looks at "samples" or spaced groups of unit length pulses during the character timing periods. Any measurements of distortion which are indicated in the meter circuits will be correct providing end distortion did not exist on the particular M-S transition which the circuit considered as a start pulse.

An embodiment of the invention has been shown and described as it applies to the measurement of start-stop and synchronous telegraph pulses. The measurement of data pulses would use the very same circuitry as that previously described with the input of the data pulses being on the high impedance input line. The variable bias on the base of the input transistor switch 18 would have to be adjusted to obtain the proper switching of this transistor in response to the incoming signal.

It will be apparent that various modifications may be made to the disclosed apparatus within the spirit and scope of the invention and it is desired, therefore, that only such limitations be placed on the invention as are imposed by the prior art and set forth in the appended claims.

We claim:

1. A pulse distortion measuring device for measuring and indicating the distortion of pulses in a pulse train comprising a bistable device connected to be in one conducting state upon the application of a signal to one of its inputs and to be in another conducting state upon the application of a signal to the other of its inputs, means responsive to the incoming pulses for forming signals representing the actual transition points of the incoming pulses, means for generating a timing period for the measurement of distortion, means for generating signals during said timing period representing ideal transition points for the incoming pulses, means for directing said representative actual and ideal signals to the inputs of said bistable device to switch said bistable device between its two conducting states to compare the difference in the time of occurrence between an actual and ideal signal, means responsive to the switching of said bistable device for converting a time difference to an electrical signal indicative of distortion and means for receiving said electrical signal during the timing period to produce a sensible indication.

2. A device as claimed in claim 1 further comprising means for preventing an electrical signal from reaching said receiving means except during selected intervals in said timing period.

3. A pulse distortion measuring device for measuring and indicating the distortion of marking and spacing type pulses in coded signals comprising means responsive to a first type of impulse in said signal for initiating a distortion measurement timing period, means for generating signals during said timing period representative of ideal transition points for the incoming marking and spacing pulses, means responsive to the incoming pulses for forming signals representative of actual transition points for the marking and spacing pulses, means for receiving said actual and ideal representative signals to compare the time difference between the arrival of actual and ideal representative signals, means for converting the time difference between the arrival of an actual and ideal signal to an electrical signal indicative of distortion and indicating means for receiving the electrical signals to produce a sensible indication.

4. A device as claimed in claim 3 wherein said converting means includes a resistance-capacitive timing circuit which is actuated during said time difference to accumulate a precise charge on said capacitor indicative of the percentage distortion of the actual transition point, said charge providing said electrical signal upon completion of the distortion measurement.

5. A pulse distortion measuring device for measuring and indicating the distortion of marking and spacing type pulses in coded signals comprising means responsive to a first type of impulse in said signal for initiating a distortion measurement period, means for generating signals during said timing period representative of ideal transition points for the incoming marking and spacing pulses, means responsive to the incoming pulses for forming signals representative of actual transition points for the marking and spacing pulses, a bistable device having two states of conduction connected to receive the signals representative of actual and ideal transition points, said signals serving to switch the conductive states of the bistable device, the difference in time between the arrival of a signal representative of an actual transition point and a signal representative of the ideal transition point for that actual point determining the duration of a particular conductive state, means connected to said bistable device and responsive to the duration of a particular conductive state for converting a time difference to an electric signal indicative of distortion and indicating means for receiving the electrical signals to produce a sensible indication.

6. A pulse distortion measuring device for measuring and indicating the distortion of marking and spacing type pulses in telegraph code signals having start-stop characters comprising means responsive to the start pulse in an incoming character for initiating a distortion measurement timing period, said timing period extending into the stop pulse of the character, means for generating during said timing period signals representative of ideal transition points for the incoming marking and spacing pulses in the character, means responsive to actual transitions of the marking and spacing pulses in the character for forming signals representative of the actual transition points, a bistable device having two states of conduction connected to receive the signals representative of actual and ideal transition points, said signals serving to switch the conductive states of the bistable device, the difference in time between the arrival of a signal representative of an actual transition point and a signal representative of the ideal transition point for that actual point determining the duration of a particular conductive state, means connected to said bistable device and responsive to the duration of a particular conductive state for converting a time difference to an electrical signal indicative of distortion and indicating means for receiving the electrical signals to produce a sensible indication.

7. A pulse distortion measuring device for measuring and indicating the distortion of marking and spacing type pulses in start-stop characters of telegraph code signals comprising means responsive to the arrival of a start pulse in a character for initiating a distortion measurement timing period, means for generating during said timing period pulses equal in length to one-half of an ideal unit pulse length for the marking and spacing pulses in the character, means for converting said generated pulses into signals representative of ideal and one-half ideal transition points for marking and spacing pulses in the character, means repsonsive to the incoming marking and spacing pulses in the character for forming signals representative of the actual transition points for said pulses, a trigger circuit having two stable states of operation and being connected to receive the signals representative of actual, ideal and one-half ideal transition points, said one-half ideal representative signal serving to condition the trigger circuit so that it is in one of said two stable states of operation, said ideal and actual representative signals serving to trigger said trigger circuit from said one stable state to the other stable state and back to said one state when distortion is present, means connected to said trigger circuit and responsive to the duration of said other of said two stable states for converting said duration to an electrical signal and indicating means for receiving said electrical signal to produce a sensible indication.

8. A device as claimed in claim 7 wherein said converting means includes a resistive-capacitive timing circuit which is actuated during said duration to accumulate a precise charge on said capacitor indicative of the percentage distortion of the actual transition point, said charge providing said electrical signal upon completion of the distortion measurement.

9. A device as claimed in claim 7 in which the output of said generating means is used to control the timing period whereby said period extends from the start pulse into the stop pulse of a character.

10. A device as claimed in claim 9 further comprising means for preventing the electrical signals from reaching said indicating means except during selected intervals in said timing period.

11. A pulse distortion measuring device for measuring and indicating the distortion of marking and spacing type pulses in telegraph code signals comprising means responsive to a pulse transition in said code signal for initiating a distortion measurement timing period, maens for generating signals during said timing period representative of ideal transition points for the incoming marking and spacing pulses, means repsonsive to the incoming code signal for forming signals representative of actual transition points for the marking and spacing pulses, means connected to receive said actual and ideal representative signals to compare the time of arrival of an actual representative signal with an ideal representative signal, means for converting a time difference between arrival times to an electrical signal indicative of distortion, a bias distortion indicating circuit, a total distortion indicating circuit, said indicating circuits connected to receive electrical signals from said converting means to give a sensible indication of distortion.

12. A device as claimed in claim 11 further comprising first measn for preventing electrical signals from reaching said bias distortion indicating circuit except those signals which correspond to bias distortion and second means for preventing electrical signals from reaching either indicating circuit except during selected intervals in said timing period.

References Cited

UNITED STATES PATENTS

| | | | |
|---|---|---|---|
| 2,985,716 | 5/1961 | Day | 178—69 |
| 3,069,498 | 12/1962 | Frank | 178—69 |
| 3,130,268 | 4/1964 | Peterson et al. | 178—69 |
| 3,260,799 | 7/1966 | Simpson et al. | 178—69 |

NEIL C. READ, *Primary Examiner.*

THOMAS A. ROBINSON, *Examiner.*